(12) United States Patent
Peterson, III et al.

(10) Patent No.: US 9,927,589 B2
(45) Date of Patent: *Mar. 27, 2018

(54) ARMORED FLEXIBLE FIBER OPTIC ASSEMBLY

(71) Applicant: Certicable, Inc., Farmingdale, NY (US)

(72) Inventors: Christian A. Peterson, III, West Babylon, NY (US); Barry Skolnick, Islip, NY (US)

(73) Assignee: Certicable, Inc., Farmingdale, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/882,716

(22) Filed: Oct. 14, 2015

(65) Prior Publication Data

US 2016/0131863 A1     May 12, 2016

Related U.S. Application Data

(63) Continuation of application No. 14/055,611, filed on Oct. 16, 2013, now Pat. No. 9,182,562.

(51) Int. Cl.
*G02B 6/44* (2006.01)

(52) U.S. Cl.
CPC ......... *G02B 6/4433* (2013.01); *G02B 6/4435* (2013.01); *G02B 6/4463* (2013.01); *G02B 6/4434* (2013.01)

(58) Field of Classification Search
None
See application file for complete search history.

(56) References Cited

U.S. PATENT DOCUMENTS

| | | | |
|---|---|---|---|
| 6,064,786 A | 5/2000 | Cunningham et al. | |
| 9,182,562 B2* | 11/2015 | Peterson, III | G02B 6/4435 |
| 2003/0118295 A1 | 6/2003 | Lail et al. | |
| 2006/0239624 A1* | 10/2006 | Hsu | G02B 6/4429 |
| | | | 385/107 |
| 2008/0008430 A1 | 1/2008 | Kewitsch | |
| 2008/0247717 A1 | 10/2008 | Patlakh | |
| 2011/0103796 A1 | 5/2011 | Mazzini et al. | |
| 2012/0044627 A1 | 2/2012 | Haigh | |

FOREIGN PATENT DOCUMENTS

| | | |
|---|---|---|
| CN | 2760585 | 2/2006 |
| CN | 201051166 | 4/2008 |
| CN | 201673290 | 12/2015 |
| EP | 0505828 A1 | 9/1992 |

OTHER PUBLICATIONS

BendSafe Rugged Drop Cable (Prime Optical Fiber Corporation) Aug. 2009; retrieved from the internet, URL: http://support.elmark.com.pl/pofc/BendSafe/BendSafe_Rugged_Drop_Cable.pdf.

* cited by examiner

*Primary Examiner* — Sung Pak
(74) *Attorney, Agent, or Firm* — Steven M. Crosby; Feldman Law Group, P.C.

(57) ABSTRACT

The specification relates to a fiber optic cable assembly. The fiber optic cable assembly includes a non-interlocking armor, the non-interlocking armor is a spiral tube having a minimum bend radius of approximately 5 mm, the non-interlocking armor being formed from a single, continuous metallic strip; an inner jacket, the inner jacket having an outside diameter slightly less than an inner diameter of the non-interlocking armor; and at least one fiber optic fiber.

12 Claims, 2 Drawing Sheets

ARMORED FLEXIBLE FIBER OPTIC ASSEMBLY

CROSS REFERENCE TO RELATED APPLICATION

This application is a continuation of U.S. patent application Ser. No. 14/055,611, filed on Oct. 16, 2013, now pending. The patent application identified above is incorporated here by reference in its entirety to provide continuity of disclosure.

BACKGROUND

The disclosed technology relates generally to an armored flexible fiber optic assembly. Traditionally, fiber optic assemblies include optical fibers that conduct light for transmitting voice, video and/or data. The construction of fiber optic cables preserves optical performance of the fibers when deployed in an intended environment while also meeting official standards for the environment. For instance, indoor cables for riser and/or plenum spaces may require certain flame-retardant ratings to meet the demands of the space. These flame-retardant ratings can be in addition to mechanical requirements or desired characteristics for the space, e.g., crush performance, permissible bend radii, temperature performance, and the like. These characteristics are desired to inhibit undesirable optical attenuation or impaired performance during installation and/or operation within the space.

By way of example, some indoor applications use a fiber optic cable disposed within an armor layer for providing improved crush performance in riser and/or plenum spaces. For instance, conventional armored constructions have a fiber optic cable disposed within a metallic interlocking armor. This interlocking armor can be wound about the fiber optic cable so that the edges of the adjacent wraps of armor mechanically interlock forming an interlocked armor layer with a large bend radius, e.g., greater than 75 mm and a large outside diameter (OD), e.g., 12.5 mm.

SUMMARY

This specification describes technologies relating to an armored flexible fiber optic assembly. In one implementation, the fiber optic cable assembly comprises: a non-interlocking armor, the non-interlocking armor is a spiral tube having an outside diameter of approximately 1.5 mm-5.5 mm, an inner diameter of approximately 0.75 mm-5.25 mm and a minimum bend radius of approximately 5 mm, the non-interlocking armor being formed from stainless steel; an inner jacket, the inner jacket having an outside diameter slightly less than the inner diameter of the non-interlocking armor; at least one fiber optic fiber; and a strengthening material, the strengthening material being made from aramid fibers and surrounding the at least one fiber optic fiber underneath the inner jacket.

Some implementations also comprise: an outer jacket, the outer jacket having an inside diameter slightly greater than the outside diameter of the non-interlocking armor; and a pull material, the pull material being made from aramid fibers, the pull material being positioned underneath the outer jacket and on top of the non-interlocking armor.

In some implementations, the non-interlocking armor can have one or more of the following: a gap between each concentric ring, the gap is approximately 0.05 mm to 1 mm; a thickness of approximately 0.25 mm-0.75 mm; and/or a crush resistance of approximately ≥100 KGf/100 mm. The fiber optic cable assembly can also have an outside diameter of approximately 1.65 mm to 5.5 mm.

In some implementations, the at least one fiber optic fiber can be a 62.5/125 µm multimode fiber, a 50/125 µm 10 G OM3/OM4 fiber, a 9/125 µm single mode G.652.D fiber, a 9/125 µm single mode bend-insensitive fiber, or any suitable fiber, for example, G.657.A1, G.657.A2, G.657.B1, G.657.B2, G.657.B3.

The advantages of the fiber optic cable are a smaller OD and a highly flexible fiber. The cable is much easier to install and saves space in data centers, cable trays and under raised floors.

DETAILED DESCRIPTION

Figure 1:
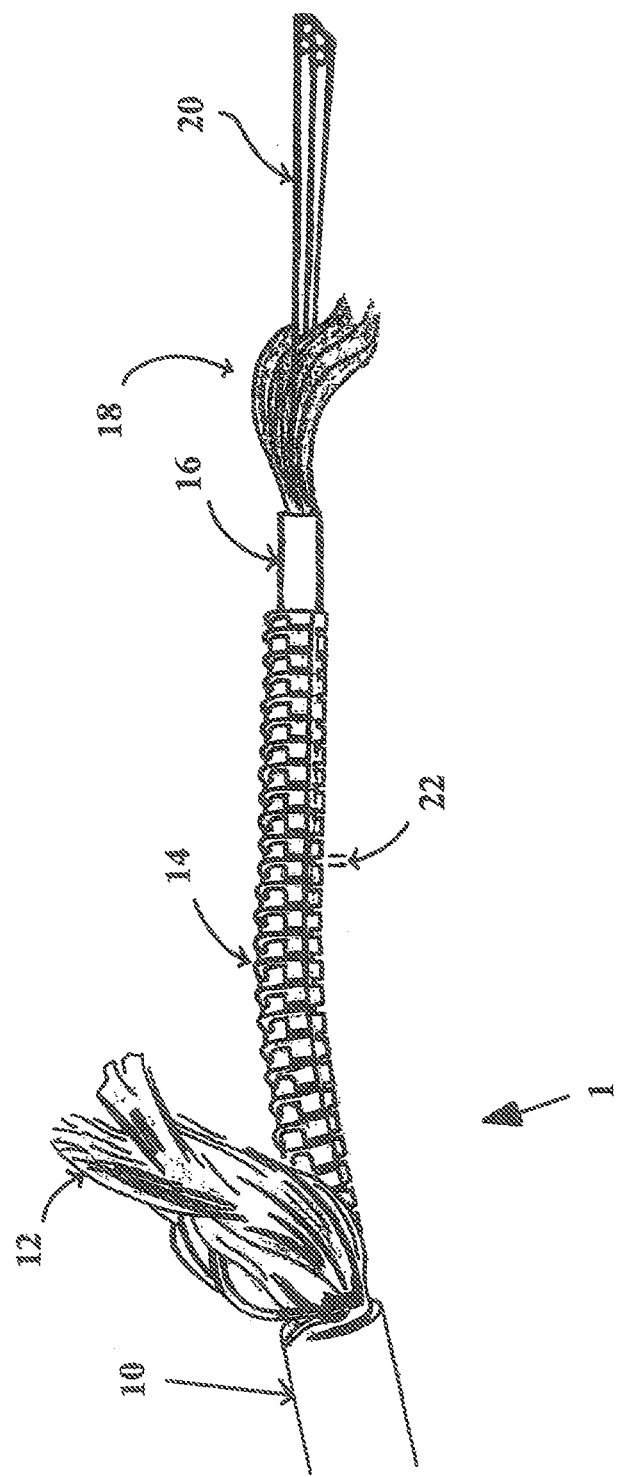
FIG. 1 shows a side view of an armored flexible fiber optic assembly.

This specification describes technologies relating to flexible armor for fiber optic cable assemblies. The fiber optic cable of the disclosed technology is armored yet flexible with a smaller OD than conventional armored fiber optic cables typically used in the telecommunications market.

Fiber optic cable assemblies refer to the complete assembly of fibers, e.g., buffer tubes, ripcords, stiffeners, strengthening material, outer and inner protective coverings, etc. Fiber optic cable assemblies provide protection for the optical fiber or fibers within the environment in which the cable is installed. Fiber optic cable assemblies come in many different types, depending on the number of fibers and how and where it will be installed.

A function of the cable assembly is to protect the fibers from the environment encountered in and after installation, e.g., will the cable: (1) become wet or moist; (2) have to withstand high pulling tension for installation in conduit or continual tension as in aerial installations; (3) have to be flame-retardant; (4) be installed around tight bends; (5) be exposed to chemicals; (6) have to withstand a wide temperature range; (7) be gnawed on by rodents; and (8) be exposed to any other environmental issues.

The bend radius is of particular importance in the handling of fiber optic cables. The minimum bending radius varies with different cable designs. That is, optical fiber is sensitive to stress, particularly bending. When stressed by bending, light in the outer part of the core is no longer guided in the core of the fiber so some is lost, coupled from the core into the cladding, creating a higher loss in the stressed section of the fiber. Fiber coatings and cables are designed to prevent as much bending loss as possible, but its part of the nature of the fiber design. Bending losses are a function of the fiber type (e.g., single mode or multi mode), fiber design (e.g., core diameter and numerical aperture), transmission wavelength (e.g., longer wavelengths are more sensitive to stress) and cable design (e.g., fire resistance and/or crush resistance). The normal recommendation for fiber optic cable bend radius is the minimum bend radius under tension during pulling is 20 times the diameter of the cable. When not under tension, the minimum recommended long term bend radius is 10 times the cable diameter. Besides mechanical destruction, excessive bending of fiber-optic cables can cause microbending and macrobending losses. Microbending causes light attenuation induced by deformation of the fiber while macrobending loss refers to losses induced in bends around mandrels or corners in installations.

To avoid microbending and macrobending issues, bend insensitive fiber have been developed. Bend insensitive (BI) fiber cable offers greater flexibility in demanding environments than traditional fiber cable. It is typically used in data centers or any space constrained area where tight bends and flexibility are required. Bend-insensitive fibers may add a layer of glass around the core of the fiber which has a lower index of refraction that literally "reflects" weakly guided modes back into the core when stress normally causes them to be coupled into the cladding. In some fibers, a trench, or moat, surrounds the core in both BI single mode fiber (SMF) and BI multi mode fiber (MMF) to reflect lost light back into the core. The trench is an annular ring of lower index glass surrounding the core with very carefully designed geometry to maximize the effect. Bend-insensitive fiber has obvious advantages. In patch panels, it does not suffer from bending losses where the cables are tightly bent around the racks. In buildings, it allows fiber to be run inside molding around the ceiling or floor and around doors or windows without inducing high losses. It's also guards against problems caused by careless installation.

Under the outer jacket 10 is the outer pull material 12. The outer pull material 12 can be aramid fibers which absorb the tension needed to pull the cable during installation. Aramid fibers are used because of their strength and the fact that they do not stretch. If pulled hard, the aramid fibers will not stretch but may eventually break when tension exceeds their limits. The proper method of pulling fiber optic cables is always to attach a pull rope, wire or tape to the pull material. For short term stresses, the maximum tension is approximately 800N. For long term stresses, the maximum tension is approximately 600N.

The armor 14 can be a non-interlocking stainless steel tube, e.g. SUS 204. The benefit of using a non-interlocking armor is that the bend radius is substantially smaller than a bend radius of an interlocked steel tube. It is also much lighter and easier to work with. The armor 14 can be a spiral tube having a gap 22 between each spiraling ring, the gap 22 can be 0.05 mm to 1 mm. The spiral tube 14 has an OD of approximately 1.5 mm-5.5 mm, a thickness of approximately 0.25 mm-0.75 mm and an inner diameter of approximately 0.75 mm-5.25 mm. The armor has a crush resistance of approximately ≥100 KGf/100 mm. The armor 14 offers increased crush protection, higher axial strength and corrosion resistance.

The table below shows examples of varying armors:

|  | Material | Outer Diameter | Inner Diameter | Thickness | Strength | Bend Radius |
| --- | --- | --- | --- | --- | --- | --- |
| 1 Core | SUS204 | 1.65 ± 0.05 mm | 1.25 ± 0.05 mm | 0.25 ± 0.02 mm | ≥300 KGf/100 MM | ≥5D |
| 2 Cores | SUS204 | 2.75 ± 0.05 mm | 2.05 ± 0.05 mm | 0.32 ± 0.02 mm | ≥300 KGf/100 MM | ≥5D |
| 4 Cores | SUS204 | 3.05 ± 0.05 mm | 2.35 ± 0.05 mm | 0.32 ± 0.02 mm | ≥300 KGf/100 MM | ≥5D |
| 6 Cores | SUS204 | 3.55 ± 0.05 mm | 2.85 ± 0.05 mm | 0.35 ± 0.02 mm | ≥300 KGf/100 MM | ≥5D |
| 12 Cores | SUS204 | 3.55 ± 0.05 mm | 2.85 ± 0.05 mm | 0.35 ± 0.02 mm | ≥300 KGf/100 MM | ≥5D |
| 24 Cores | SUS204 | 4.05 ± 0.05 mm | 3.25 ± 0.05 mm | 0.42 ± 0.02 mm | ≥300 KGf/100 MM | ≥5D |

Many applications for BI SMF are in premises installations like apartment buildings or for patchcords, where it simplifies installation and use. BI SMF is also used in outside plant cables since it allows fabrication of smaller, lighter high fiber count cables.

In many applications were BI fiber are used, the fiber may be exposed crush loads as well as rodents. The problem that arises is that the armor used to protect standard fiber has a bend radius of usually <75 and an OD of 12.5 mm. When used in applications with tight bend area, the armored cable either does not fit into tight spaces due to its large OD and/or does not conform to a necessary bend. In these cases, unarmored fiber optic cables are used. This leaves open the possibility of the cable being crushed or cut.

Figure 2:
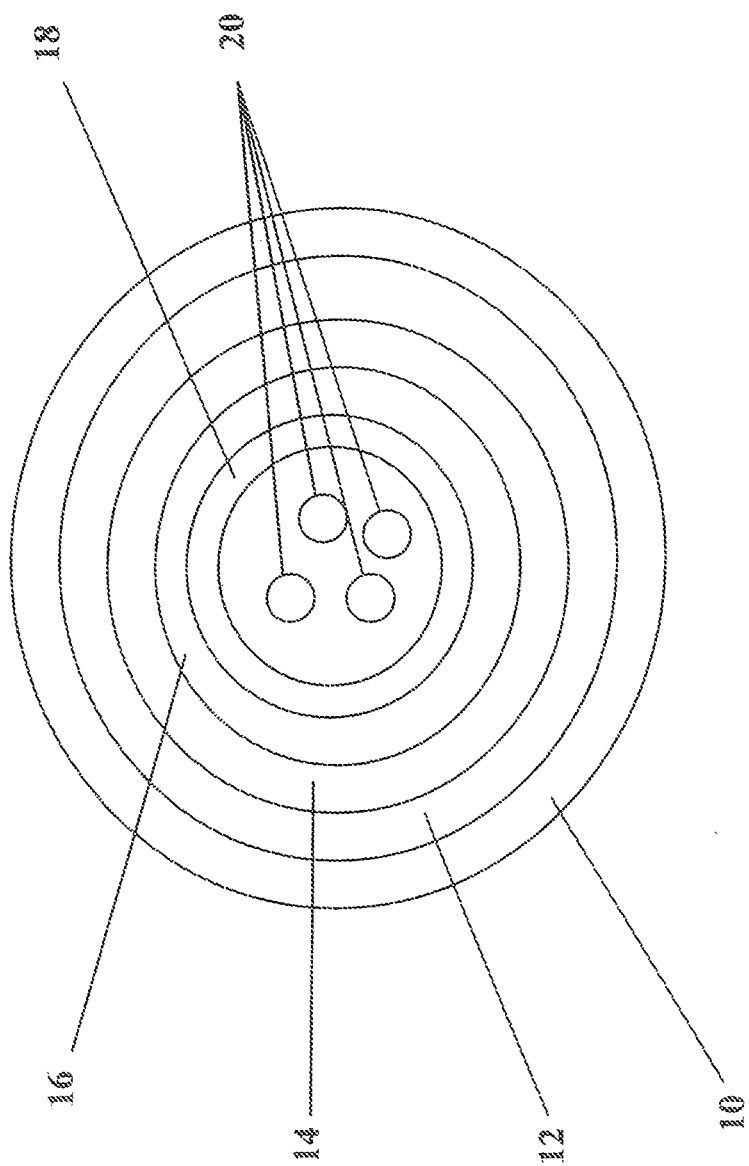
FIG. 2 shows a cross section of an armored flexible fiber optic assembly.

The subject matter of the disclosed technology overcomes this problem by using a highly flexible armor with a smaller OD. As shown in FIGS. 1 and 2, the fiber optic cable assembly 1 includes an outer jacket 10, an outer pull material 12, stainless steel armor 14, an inner jacket 16, an inner strengthening material 18 and one or more fiber optic fibers 20.

The outer jacket 10 is the outermost layer of protection for the fibers 20 that is chosen to withstand the environment in which the cable 1 is installed. For outside cables, the outer jacket 10 will generally be black polyethylene (PE) which resists moisture and sunlight exposure. For indoor cables, the outer jacket 10 may be a flame-retardant jacket that can be color-coded to identify the fibers 20 inside the cable 1, e.g., PVC, LSZH, TPU, ETFE or OFNP. The jacket 10 thickness can be approximately 0.25 mm-1.5 mm and come in a variety of colors, e.g., yellow, orange, aqua, blue, etc.

An inner jacket 16 is a layer of protection for the fibers 20 of the fiber cables 1 that have been stripped of the outer protective layer 12 and armor 14. The inner jacket 16 is chosen to withstand the environment in which the cable 1 is installed. The inner jacket 16 may be a flame-retardant jacket that can be color-coded to identify the fibers 20 inside the cable, e.g., PVC, LSZH, TPU, ETFE or OFNP. The jacket 16 thickness can be approximately 0.25 mm-1.5 mm and come in a variety of colors, e.g., yellow, orange, aqua, blue, etc. In most cases, the color of the inner jacket 16 is the same as the color for the outer jacket 10.

The strengthening material 18 at least partially surrounds the optical fibers 20. The strengthening material 18 may be formed of any suitable material. According to some embodiments, the strengthening material 18 can be aramid fibers. Other suitable materials may include fiberglass or polyester. The strengthening material 18 can be aramid fibers which can absorb the tension needed to pull the inner cable and provide cushioning for the fibers 20, thus ensuring that the optical fibers do not stretch or bind within the cable.

Optical fibers 20 consist of a core and a cladding layer, selected for total internal reflection due to the difference in the refractive index between the two. In practical fibers, the cladding is usually coated with a layer of acrylate polymer or polyimide. This coating protects the fiber from damage but does not contribute to its optical waveguide properties. Individual coated fibers (or fibers formed into ribbons or bundles) then have a tough resin buffer layer and/or core tube(s) extruded around them to form the cable core. A standard fiber has a primary buffer coating of approximately 250 microns and can add a tight buffer coating such as a soft protective coating applied directly to the 250 micron coated fiber to provide additional protection for the fiber, allowing easier handling and even direct termination for the fiber.

In some implementations, the optical fibers 20 can be 62.5/125 μm multimode fibers, 50/125 μm 10 G OM3/OM4 fibers, 9/125 μm single mode G.652.D fibers, 9/125 μm single mode bend-insensitive fibers, or any suitable fibers, for example, G.657.A1, G.657.A2, G.657.B1, G.657.B2, G.657.B3.

While this specification contains many specific implementation details, these should not be construed as limitations on the scope of the disclosed technology or of what can be claimed, but rather as descriptions of features specific to particular implementations of the disclosed technology. Certain features that are described in this specification in the context of separate implementations can also be implemented in combination in a single implementation. Conversely, various features that are described in the context of a single implementation can also be implemented in multiple implementations separately or in any suitable subcombination. Moreover, although features can be described above as acting in certain combinations and even initially claimed as such, one or more features from a claimed combination can in some cases be excised from the combination, and the claimed combination can be directed to a subcombination or variation of a subcombination.

The foregoing Detailed Description is to be understood as being in every respect illustrative, but not restrictive, and the scope of the disclosed technology disclosed herein is not to be determined from the Detailed Description, but rather from the claims as interpreted according to the full breadth permitted by the patent laws. It is to be understood that the implementations shown and described herein are only illustrative of the principles of the disclosed technology and that various modifications can be implemented without departing from the scope and spirit of the disclosed technology.

The invention claimed is:

1. A fiber optic cable assembly comprising:
   a non-interlocking armor, the non-interlocking armor is a spiral tube having a minimum bend radius of approximately 5 mm, the non-interlocking armor being formed from a single, continuous metallic strip;
   an inner jacket, the inner jacket having an outside diameter slightly less than an inner diameter of the non-interlocking armor;
   a strengthening material, the strengthening material surrounding the at least one fiber optic fiber underneath the inner jacket;
   an outer jacket, the outer jacket having an inside diameter slightly greater than an outside diameter of the non-interlocking armor; and
   at least one fiber optic fiber.

2. The fiber optic cable assembly of claim 1 further comprising:
   a pull material, the pull material being made from aramid fibers, the pull material being positioned underneath the outer jacket and on top of the non-interlocking armor.

3. The fiber optic cable assembly of claim 1 wherein the single, continuous metallic strip is stainless steel.

4. The fiber optic cable assembly of claim 1 wherein the non-interlocking armor has an outside diameter of approximately 1.5 mm-5.5 mm.

5. The fiber optic cable assembly of claim 1 wherein the non-interlocking armor has an inner diameter of approximately 0.75 mm-5.25 mm.

6. The fiber optic cable assembly of claim 1 wherein the non-interlocking armor has a gap between each spiraling ring, the gap is approximately 0.05 mm to 1 mm.

7. The fiber optic cable assembly of claim 1 wherein the non-interlocking armor has a thickness of approximately 0.25 mm-0.75 mm.

8. The fiber optic cable assembly of claim 1 wherein the non-interlocking armor has a crush resistance of approximately ≥100 KGf/100 mm.

9. The fiber optic cable assembly of claim 1 wherein the fiber optic cable assembly has an outside diameter of approximately 1.65 mm to 5.5 mm.

10. A fiber optic cable assembly comprising:
    a non-interlocking armor, the non-interlocking armor is a spiral tube having a minimum bend radius of approximately 5 mm, the non-interlocking armor being formed from a single, continuous metallic strip;
    an outer jacket, the outer jacket having an inside diameter slightly greater than an outside diameter of the non-interlocking armor;
    a pull material, the pull material being made from aramid fibers, the pull material being positioned underneath the outer jacket and on top of the non-interlocking armor;
    an inner jacket, the inner jacket having an outside diameter slightly less than an inner diameter of the non-interlocking armor; and
    a strengthening material, the strengthening material surrounding the at least one fiber optic fiber underneath the inner jacket; and
    at least one fiber optic fiber.

11. The fiber optic cable assembly of claim 10 wherein the single, continuous metallic strip is stainless steel.

12. A fiber optic cable assembly comprising:
    a non-interlocking armor, the non-interlocking armor is a spiral tube having a minimum bend radius of approximately 5 mm, the non-interlocking armor being formed from a single, continuous metallic strip;
    an outer jacket, the outer jacket having an inside diameter slightly greater than an outside diameter of the non-interlocking armor;
    an inner jacket, the inner jacket having an outside diameter slightly less than an inner diameter of the non-interlocking armor;
    a strengthening material, the strengthening material surrounding the at least one fiber optic fiber underneath the inner jacket; and
    a pull material, the pull material being positioned underneath the outer jacket and on top of the non-interlocking armor; and
    at least one fiber optic fiber,
    wherein the single, continuous metallic strip is stainless steel.

* * * * *